United States Patent [19]

Rosen et al.

[11] 4,083,389

[45] Apr. 11, 1978

[54] STAR-WHEEL INDEXING SYSTEM FOR AUTOMATIC FILLING MACHINES

[75] Inventors: Sidney Rosen, 4119-27 Fordleigh Rd., Baltimore, Md. 21215; Richard Nelson Bennett, Arbutus, Md.

[73] Assignees: Sidney Rosen; National Instrument Company, both of Baltimore, Md.

[21] Appl. No.: 708,635

[22] Filed: Jul. 26, 1976

[51] Int. Cl.² ............................................. B65B 43/56
[52] U.S. Cl. ................................... 141/179; 141/180; 198/425
[58] Field of Search ........................ 198/425, 444, 491; 141/179, 180, 126–178, 181–192, 234–248, 250–284, 367, 368, 378

[56] References Cited

U.S. PATENT DOCUMENTS

| 3,067,786 | 12/1962 | Rosen | 141/179 |
| 3,279,581 | 10/1966 | Drennan | 198/444 |

*Primary Examiner*—Houston S. Bell, Jr.
*Attorney, Agent, or Firm*—Craig & Antonelli

[57] ABSTRACT

An indexing system for filling machines used to fill small containers transported on an endless conveyor belt, which includes a container-driven star-wheel, a member preventing the free rotation of the star-wheel and a cam-operated control for enabling and disabling the free, container-driven rotation of the star-wheel.

21 Claims, 4 Drawing Figures

STAR-WHEEL INDEXING SYSTEM FOR AUTOMATIC FILLING MACHINES

The present invention relates to a high-speed automatic filling machine for rapidly and accurately filling small containers, and more particularly to an automatic indexing system for such filling machines.

In the prior art filling machines of the type described, for example, in my prior U.S. Pat. No. 2,807,213, small containers such as bottles, etc. are fed on a conveyor belt into a position underneath lowerable nozzles of the filling machine, where they are held in predetermined position while the nozzles are lowered and discharge the product to be filled into the small containers. As soon as the filling operation is substantially completed, the nozzles are raised out of the small containers, whereafter the movement of the containers is again released to permit the next batch of empty containers to be placed underneath the nozzles. To avoid spillage, it is necessary that the containers be placed accurately underneath the lowerable nozzles. Additionally, the movement of the small containers, moving on a continuously operating conveyor belt, has to be positively stopped once the predetermined number of containers reach their position under the nozzles and released again as soon as the nozzles have cleared the filled containers.

An indexing system is normally used with such filling machines to perform the functions of stopping and releasing the containers in timed relation to the filling operation involving the lowering and raising of the nozzles. Since speed is an important factor with these filling machines, it is necessary that the indexing system not only operate very accurately but also permit a high-speed indexing of the containers.

Different types of indexing systems are known in the prior art. For example, in my prior U.S. Pat. No. 3,237,661, two separation bars or fingers 26 and 28, which were pneumatically operated, were used to hold the containers in place under the nozzles during the filling cycle. In the indexing system of my prior U.S. Pat. No. 3,237,661, after the bottles are filled, the indexing finger 28 is released (retracted) prior to release (retraction) of the indexing finger 26 so as to permit transport of the next set of bottles by the moving conveyor to the position previously occupied by the filled bottles which had just been filled and released. Due to the earlier retraction of the indexing finger 28, prior to the retraction of the indexing finger 26, a space is created between the bottles for the re-engagement of the indexing finger 28 when it moves again into the space between the last bottle previously filled and the first empty bottle. As a result thereof, the indexing system of my prior U.S. Pat. No. 3,237,661 requires relatively higher belt speeds, thereby increasing the possibility of spillage. Moreover, the increased belt speed limits the size and number of containers that can be filled simultaneously.

The indexing system of my prior U.S. Pat. No. 3,237,661 requires also a certain minimum number of parts to achieve the intended purpose including control cams and contacts operated thereby which not only increase the cost of the system but also increase the source of error and/or the possibility of malfunctioning due to failure of any one part.

Furthermore, the physical location of the indexing fingers 26 and 28 to one another and to the filling nozzles is fairly critical so that they must be normally fixed on the machine in a carefully adjusted position, which requires careful adjustment in case of change in the shape and/or number of containers to be simultaneously filled, and thus impairs the ready, simple conversion of the equipment with respect to the number and shape of containers that can be simultaneously filled, i.e., the indexing system of my prior art U.S. Pat. No. 3,237,661 does not lend itself readily without precise adjustments of the fingers 26 and 28 to converting the filling machine, for example, from simultaneously filling two containers to, for example, simultaneously filling four containers.

According to another proposal, as described in my copending U.S. application Ser. No. 512,351, filed Oct. 4, 1974, and entitled "Fluid Filling Machine", an indexing system is described utilizing an electronic counter in conjunction with a spiral indexing and conveying member. While the operation of the indexing system of this copending application permits the attainment of a high degree of accuracy and reliability in operation, it is relatively expensive in manufacture and installation, particularly in view of the cost of the electronic counter and the electro-mechanical control system required therefor.

It is therefore the aim of the present invention to provide an automatic indexing system for high-speed filling machines of the type described above which eliminates the aforementioned shortcomings and drawbacks encountered in the prior art.

The underlying problems are solved in accordance with the present invention by the use of a container-driven star-wheel which is freely rotatably mounted and driven by the containers engaging the prongs thereof while being transported or moved by the conveyor belt, and which is so located in relation to the moving containers that when stopped in a predetermined position, a prong of the star-wheel will project into the path of the farthest downstream container to be filled to thereby stop all containers located upstream thereof in order to permit a predetermined number of the stopped containers to be filled. According to another feature of this invention, a pneumatically or electrically operated movable stop pawl is provided in the machine below the star-wheel and in such location with respect thereto that the movable stop pawl normally projects upwardly into the path of and engagement with a downwardly projecting stop pin projecting downwardly from the underside of the star-wheel. The pneumatically or electrically operated pawl, normally holding the star-wheel stationary, is actuated by a cam-operated switch actuated by a cam mounted on the filler output shaft or pump shaft. In a predetermined position of the output or pump shaft, the cam of the switch then closes the switch to provide a short electric pulse so as to momentarily remove the stop pawl out of engagement with the stop pin on the star-wheel. The container-driven star-wheel is then able to rotate freely as a result of the force applied thereagainst by the moving containers, conveyed by the continuously operating conveyor belt, and will stop to rotate when the pawl which will return to its upwardly projecting position almost immediately after the release of the star-wheel abuts again at the stop pin and therewith again holds the star-wheel stationary during the next filling operation.

The star-wheel indexing system of the present invention provides a number of significant advantages over the prior art. First of all, the star-wheel indexing systems of this invention is far more simple than the prior art indexing system and involves far fewer parts than the prior art indexing systems. In addition to extreme simplicity, it eliminates the need for precise synchronization between the belt speed of the conveyor and the speed of the filling machine, as required in the prior art indexing systems. This is so as the user simply adjusts the belt speed so that bottles are in position under the nozzles when the filler is ready to discharge the liquid. In contrast thereto, the speed of the belt in the gating system of my prior U.S. Pat. No. 3,237,661 has to be adjusted precisely so that the stop finger will enter into the space created between the filled and empty containers and thereby will stop the motion of the empty containers. This is completely eliminated by the star-wheel indexing system of the present invention, thus enabling a decrease in the belt speed.

Thus, in the star-wheel indexing system of the present invention, the belt speed is simply adjusted without the need for great accuracy so that a set of empty containers is located underneath the nozzles when the filling machine is ready to discharge the liquid while the containers are held stationary by the stopped star-wheel.

Furthermore, any shape or bottle can be handled by the star-wheel indexing system of the present invention by simply providing an appropriate, proper contour in the star-wheel.

Moreover, the star-wheel indexing system of the present invention can be readily adapted to change the number of containers which are to be simultaneously filled by merely changing the number of stop pins projecting from the star-wheel and/or the star-wheel itself which can be readily installed and removed.

Star-wheel devices as such are known in the prior art. For example, the U.S. Pat. No. 2,274,606 to Christiansen discloses a star-feed-wheel for use in can packing machines. However, in this prior art U.S. Pat. No. 2,274,606 as well as in other similar patents (U.S. Pat. No. 2,584,338 and U.S. Pat. No. 2,949,941), the star-wheels are all positively driven by the power take-off from the machine drive and merely act as guide but not as indexing means. In contradistinction thereto, the star-wheel in the indexing mechanism of the present invention is freely rotatable and, not positively driven from a motor, its rotation being produced by the moving containers on the conveyor belt, as they come into successive contact with the prongs of the star-wheel.

The starting and stopping of the star-wheel in the indexing system of the present invention is synchronized with the movement of the pistons in the metering pumps, by the use of only a single cam-operated switch cooperating with a shaft which drives the metering pumps, while the incremental rotation of the star-wheel in the indexing system of the present invention is determined by the location and number of the stop member or members projecting downwardly from the star-wheel which engage with the movable pawl.

Thus, while star-wheels were known in the prior art, their function was primarily that of positively driven guides but not as container-driven indexing devices for the purposes of the present invention.

Accordingly, it is an object of the present invention to provide an indexing system for high-speed filling machines which avoids by simple means the aforementioned shortcomings and drawbacks encountered in the prior art.

Another object of the present invention resides in an indexing system for high-speed filling machines which is simple in construction, reliable in operation and inexpensive to manufacture and assemble.

A further object of the present invention resides in an indexing system which requires no positive drive of any movable indexing member, yet accurately indexes the number of containers which are simultaneously filled by the machine.

Still a further object of the present invention resides in an indexing system for high-speed filling machines which obviates the need for a precise synchronization between the belt speed of the conveyor and the speed of the filling machine.

A further object of the present invention resides in an indexing system for high-speed filling machines for filling small containers which not only offers great versatility as to the shape and type of containers to be filled but also permits ready change-over of the machine for simultaneously filling different numbers of small containers.

These and other objects, features and advantages of the present invention will become more apparent from the following description when taken in connection with the accompanying drawing which shows, for purposes of illustration only, one embodiment in accordance with the present invention, and wherein.

Figure 1:
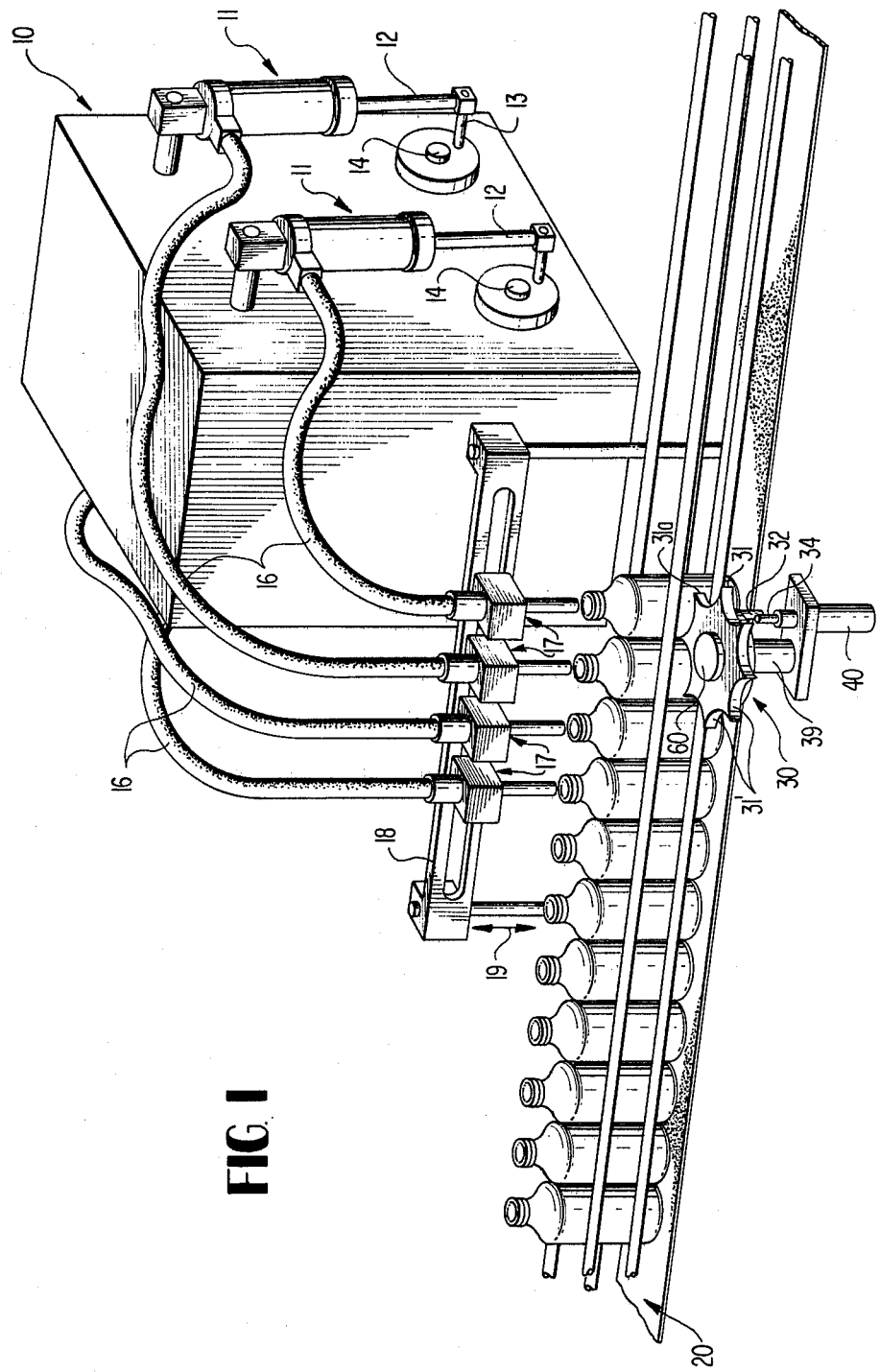
FIG. 1 is a somewhat schematic perspective view of a filling machine equipped with a star-wheel indexing system in accordance with the present invention.
Figure 2:
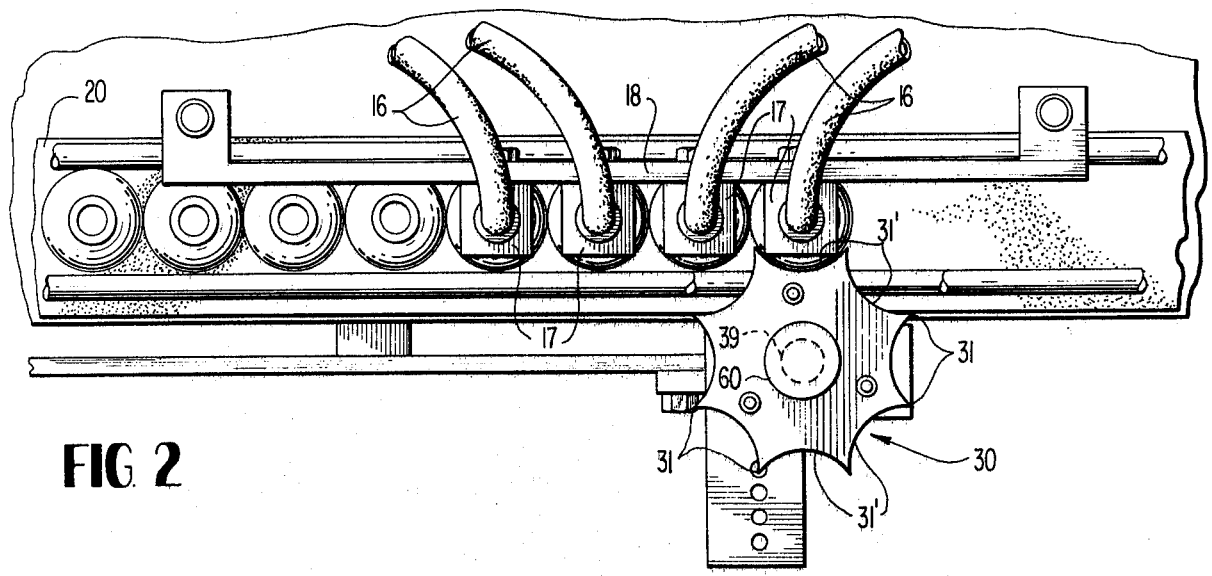
FIG. 2 is a top plan view on a part of the filling machine equipped with the star-wheel indexing system in accordance with the present invention.

Referring now to the drawing wherein like reference numerals are used throughout the various views to designate like parts, and more particularly to FIG. 1, reference numeral 10 generally designates a high-speed filling machine of any known construction which includes, for example, four pump units generally designated by reference numeral 11, of which two pumps are mounted on each side of the housing. In FIG. 1 only two of these pump units are shown, the other two pump units being located on the opposite side of the filling unit. Each pump unit includes a piston (not shown) connected with a piston rod 12 which is reciprocated by rotation of an eccentric crank pin 13, pivotally connected therewith and driven by a respective pump shaft 14.

Each pump unit 11 includes an intake (not shown) and a discharge which is connected by way of a flexible hose 16 with a filler nozzle 17, fixedly mounted on a nozzle support structure 18 which causes by conventional means the lowering and raising of the nozzles 17 in timed relation to the filling cycle as indicated by the double arrow 19.

A continuously movable conveyor belt 20 conveys the empty bottles to their filling station in the machine underneath the filling nozzles 17 where the empty containers are stopped while being filled, and then continues to transport the filled containers away from the filling machine after completion of the filling operation. The filling machine, so far described, is known in the prior art, may be of any conventional construction and forms no part of the present invention and therefore is not described in detail herein.

Figure 4:
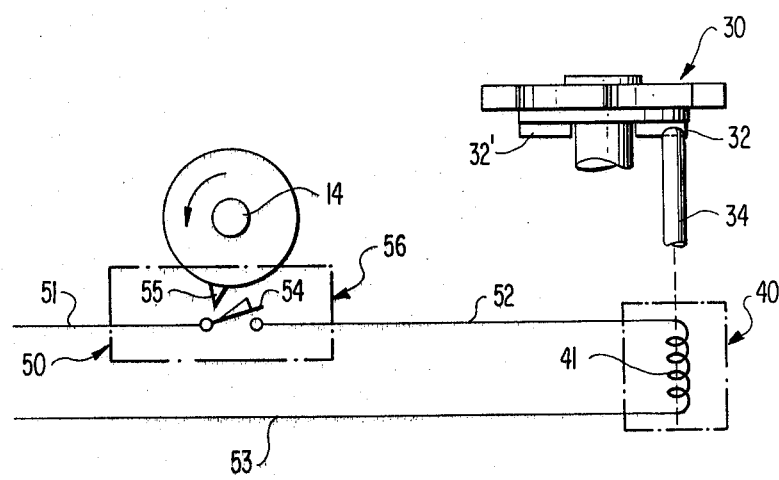
FIG. 4 is a schematic control diagram for the star-wheel indexing system in accordance with the present invention.

The indexing system of the present invention includes a star-wheel generally designated by reference numeral 30 which includes a predetermined number of equispaced, radially outwardly projecting prongs 31, in the illustrated embodiment, eight prongs 31 so interconnected by the curved portions 31' as to conform to the contour of the containers, in the instant case to the contour of cylindrical containers. The star-wheel 30 is freely rotatable on shaft 39 and in fact is actuated or driven by the movement of the containers on the belt 20 as they successively come into contact with a respective prong 31 unless the star-wheel 30 is stopped in a predetermined position. For purposes of retarding and stopping the star-wheel 30, the latter is provided with a downwardly projecting stop pin or pins 32 (FIG. 4) which is or are adapted to be engaged by an electrically or pneumatically operated stop pawl member 34 normally projecting into the path of the downwardly projecting stop pin or pins 32. An electromagnet generally designated by reference numeral 40 which is mechanically connected with the retractable stop member 34 is adapted to retract the stop member 34 upon energization thereof so as to momentarily release movement of the star-wheel which then will continue its container-driven movement until the stop pin 32 or the next stop pin on the starwheel 30 will again abut at the projecting pawl member 34 to retard and stop thereby the star-wheel 30. The electromagnetic actuating means 40 includes a winding 41 connected with an energizing circuit generally designated by reference numeral 50.

Connected between the line sections 51 and 52 of the energizing circuit 50 is a normally open switch 54 adapted to be momentarily closed by a cam 55 mounted on the pump shaft 14 or other shaft rotating in unison therewith. The parts 54, 55 thereby form a microswitch generally designated by reference numeral 56 which, when closed, closes the energizing circuit 50 consisting of line sections 51, 52 and of return line 53 to thereby energize the electromagnet 40.

OPERATION

The operation of the indexing mechanism in accordance with the present invention is as follows:

It is assumed that four bottles are situated underneath four filling nozzles 17 of a filling machine designed to fill simultaneously four bottles and are held in that position by the prong 31a (FIG. 1) of the star-wheel 30 which at that time is held stationary by engagement of a stop pin 32 with stop member 34. Even though the bottles seek to continue their movement due to the continuous operation of the endless conveyor belt 20, they are stopped in their movement by engagement of the stop pin 32 projecting downwardly from the star-wheel 30 into engagement with the upwardly extending stop pawl 34. As the four containers are held in position by the prong 31a (FIG. 1), the nozzles 17 are lowered into the four containers and commence the filling operation as the filling pumps begin their discharge strokes. As soon as the filling operation is completed and the nozzles 17 have been raised sufficiently to clear the four containers just filled, the pump shaft 14 will be in a position where the cam 55 will momentarily close the contact 54 of the microswitch 56, thereby momentarily energizing the electromagnet 40 and therewith momentarily retracting the stop member 34. Retraction of the stop member 34 will release free rotation of the star-wheel 30 until such free rotation is again inhibited by engagement of a stop pin 32 with the normally upwardly extending stop pawl 34 which will return to the normal position as soon as the microswitch 56 is permitted to open again after shaft 14 has rotated through a predetermined, relatively small angle to cause disengagement of cam 55 from microswitch 56. In the illustrated embodiment in which four containers are simultaneously filled, two stop pins 32 and 32' are provided on the eight-prong star-wheel 30 which project downwardly therefrom at mutually diametrically opposite positions, thereby permitting the star-wheel 30 to rotate by an increment corresponding to four containers, i.e., through 180°, since one complete rotation of the star-wheel with eight prongs would index eight containers.

Consequently, the four containers which had just been filled as well as all containers upstream thereof are now released and conveyance thereof is resumed as a result of the continuous movement of the conveyor belt 20. The star-wheel 30 will again be retarded and stopped by engagement of the next stop pin 32 with the pawl 34 when the next four containers have moved down the line so as to be accurately positioned underneath the nozzles 17 in order to be filled during the next filling operation, and will be held thereat until the microswitch 56 is again closed to release the star-wheel 30. It can thus be seen that the container-driven star-wheel forms an effective indexing means which is extraordinarily simple in construction also insofar as its controls are concerned.

Figure 3:
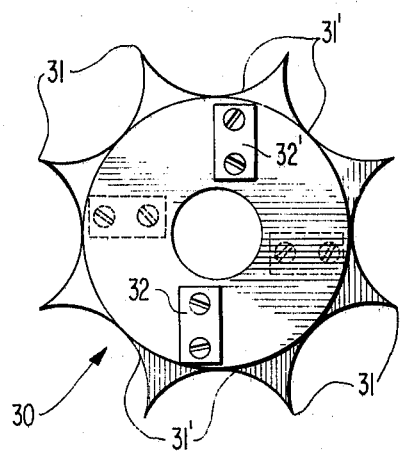
FIG. 3 is a bottom plan view on the star-wheel indexing member of the present invention.

If, for example, eight containers are to be simultaneously filled instead of the described four containers, it is only necessary, in addition to doubling the number of filling nozzles, to reduce the number of stop pins 32 which project down from the star-wheel to a single stop pin 32, for example, by removal of one of the two stop pins. Similarly, if only two containers are to be filled simultaneously, it is only necessary to double the number of downwardly projecting stop pins 32 from two to four stop pins as shown in dash and dotted lines in FIG. 3. To facilitate conversion, the star-wheel 30 may be provided with properly located fastening holes for the stop pins to be removably secured thereto, for example, by threaded means. In the alternative, it is, of course, also always possible to interchange one star-wheel having a predetermined number of prongs with another star-wheel having a different number of prongs. If a different type of container, i.e., with a different external shape is to be filled by the filling machine of the present invention, it is also only necessary to interchange the star-wheel so that its contour matches in an optimum manner the shape of the container. This can be readily done by merely unscrewing a plate 60 or the like which holds the freely rotatable star-wheel onto its support shaft 39, for example, by suitable threaded means (not shown) such as a screw.

It can thus be seen that the indexing system of the present invention which utilizes a freely rotatable, container-driven star-wheel is extremely simple in construction and operation, yet performs an accurate indexing function without danger of spilling.

In lieu of the electromagnet 40 also an air cylinder and solenoid valve may be used which opens a connection to a source of air pressure so as to momentarily retract the pawl member 34 by pneumatic means.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An indexing system for indexing containers on a conveyor, characterized by a freely rotatable, container-driven star-wheel means driven directly by successive containers engaging said star-wheel means while moved along on said conveyor, means for inhibiting the free rotation of the star-wheel means with the star-wheel means in a predetrmined position including at least one pin-like member provided directly on said star-wheel means and projecting therefrom generally in the axial direction and stop means with a stop member normally projecting into the path of said pin-like member, and control means operatively connected with said stop means and operable to momentarily disengage the stop member from said pin-like member so as to release free rotation of the freely rotatable star-wheel means driven by the containers until the stop member again stops the star-wheel means by engaging with the next pin-like member projecting into its path.

2. An indexing system for a machine having an operating cycle according to claim 1, characterized in that the star-wheel means includes means for selectively fastening thereto a predetermined number of pin-like members so as to enable selective change of the number of containers to be indexed during a given operating cycle of the machine.

3. An indexing system according to claim 1, characterized in that the inhibiting means is electricaly actuated by said control means.

4. An indexing system according to claim 1, characterized in that the inhibiting means is pneumatically operated.

5. An indexing system according to claim 1, characterized in that the star-wheel means is freely rotatably mounted, in that the stop member of the stop means is operable to normally engage with the pin-like member of the star-wheel means to stop its rotation in a predetermined position, and in that the control means releases rotation of the star-wheel means by momentary disengagement of the stop member from said pin-like member so as to enable rotation of the latter through an angular increment corresponding to the number of containers to be indexed.

6. An indexing system according to claim 5, characterized in that the pin-like member projects downwardly from the underside of the star-wheel means, and in that said stop means includes a retractable stop member operable to be momentarily retracted out of engagement with said pin member by said control means.

7. An indexing system according to claim 6, characterized in that the stop member is a retractable, pawl-like member.

8. An indexing system according to claim 7, characterized in that the stop member is electrically operated.

9. An indexing system according to claim 7, characterized in that the stop member is pneumatically operated.

10. An indexing system according to claim 6, characterized in that the control means includes cam means and cam-operated switch means momentarily closed by the cam means for momentarily disengaging the stop member from the corresponding stop pin means.

11. An indexing system according to claim 10, characterized in that the indexing system is for a filling machine operable to fill simultaneously a predetermined number of containers transported on a continuously moving conveyor and stopped during the filling operation thereof in predetermined position, the incremental rotation of the star-wheel means enabled by said control means corresponding in each case to the number of containers to be simultaneously filled by the filling machine.

12. An indexing system according to claim 11, characterized in that the star-wheel means includes an interchangeable star-wheel having a predetermined number of prongs and contoured to conform generally to the shape of the containers to be filled.

13. An indexing system according to claim 11, characterized in that the star-wheel means has means for selectively installing a varying number of pin like member means in predetermined position.

14. An indexing system for a filling machine according to claim 11, in which the machine includes a number of nozzles corresponding to the number of containers to be simultaneously filled, pump means for discharging the product to be filled by way of said nozzles into said containers, and actuating means for actuating said pump means, characterized in that the control means causes disengagement of the stop means from the star-wheel means when said actuating means is in a predetermined position corresponding to completion of the discharge stroke of the pump means.

15. An indexing system according to claim 14, characterized in that said drive means includes the cam means operable to engage with said cam-operated switch means for causing disengagement of the stop means.

16. An indexing system according to claim 1, characterized in that the indexing system is for a filling machine operable to fill simultaneously a predetermined number of containers, transported on the conveyor, whose movement is decelerated during the filling operation, the incremental free rotation of the star-wheel means enabled by said control means corresponding substantially to the number of containers to be simultaneously filled by the machine.

17. An indexing system according to claim 16, in which the filling machine includes a number of lowerable nozzles corresponding to the number of containers to be simultaneously filled, pump means for discharging the product to be filled through said nozzles into said containers, and actuating means for actuating said pump means, characterized in that the control means causes disengagement of said stop means from the star-wheel means when said actuating means is in a predetermined position corresponding to at least completion of the discharge stroke of the pump means.

18. An indexing system according to claim 17, characterized in that the actuating means includes a shaft, said control means including a cam on said shaft, a normally open switch operable to be closed by said cam, and electromagnetic means energized by closure of said switch to cause disengagement of said inhibiting means.

19. An indexing system according to claim 18, characterized in that the star-wheel means is freely rotatably mounted, in that the stop means is operable to normally engage with a respective pin-like member of the star-wheel means to stop its rotation in a predetermined position, and in that the control means releases rotation of the star-wheel means by momentary disengagement of the stop means from said pin-like member of the star-wheel means so as to enable rotation of the latter through an angular increment corresponding to the number of containers to be indexed.

20. An indexing system according to claim 19 characterized in that the electromagnetic control means momentarily disengages the stop member from said pin-like member so as to release free rotation of the container-driven star-wheel means until the stop member again stops the star-wheel means by engaging with the next pin-like member projecting into its path.

21. An indexing system according to claim 5, characterized in that the star-wheel means includes a number of fastening holes in predetermined location to selectively and detachably secure thereto the desired number of pin-like members.

* * * * *